United States Patent
Sawai et al.

(10) Patent No.: US 12,462,587 B2
(45) Date of Patent: Nov. 4, 2025

(54) DRIVER MONITORING DEVICE, DRIVER MONITORING METHOD, AND DRIVER MONITORING-USE COMPUTER PROGRAM

(71) Applicant: TOYOTA JIDOSHA KABUSHIKI KAISHA, Toyota (JP)

(72) Inventors: Shunichiro Sawai, Tokyo-to (JP); Kenichiroh Hara, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 498 days.

(21) Appl. No.: 17/656,567

(22) Filed: Mar. 25, 2022

(65) Prior Publication Data

US 2022/0309808 A1   Sep. 29, 2022

(30) Foreign Application Priority Data

Mar. 25, 2021   (JP) .................. 2021-051353

(51) Int. Cl.
G06V 20/59   (2022.01)
B60Q 9/00   (2006.01)
G06V 40/16   (2022.01)

(52) U.S. Cl.
CPC .......... *G06V 20/597* (2022.01); *G06V 40/174* (2022.01); *B60Q 9/00* (2013.01)

(58) Field of Classification Search
CPC .... G06V 20/597; G06V 40/174; G06V 40/18; B60Q 9/00; B60W 40/08; B60W 2040/0827; B60W 2420/403; B60W 50/14; B60W 2050/143; B60W 2050/146; B60W 2540/229; G08B 21/06
See application file for complete search history.

(56) References Cited

U.S. PATENT DOCUMENTS

| 2004/0243401 | A1 |   | 12/2004 | Shiomi et al. |
| 2019/0197329 | A1 | * | 6/2019 | Aoyagi .................. G06V 40/20 |
| 2020/0290543 | A1 | * | 9/2020 | Saito ..................... B60W 40/08 |
| 2021/0241011 | A1 | * | 8/2021 | Cronje ..................... G06T 7/70 |
| 2022/0001878 | A1 | * | 1/2022 | Sano .................. G01C 21/3697 |
| 2024/0034331 | A1 | * | 2/2024 | Sakai .................... B60W 40/08 |

FOREIGN PATENT DOCUMENTS

| DE | 112019007642 T5 | * | 5/2022 | .......... G06V 40/176 |
| JP | 2000113347 A |   | 4/2000 | |
| JP | 2011118831 A |   | 6/2011 | |
| JP | 2018143285 A |   | 9/2018 | |
| JP | 2019111090 A |   | 7/2019 | |
| JP | 6689470 |   | 4/2020 | |
| JP | 2020149499 A |   | 9/2020 | |
| KR | 20220075105 A | * | 6/2022 | ............. A61B 5/163 |
| WO | 2020/084469 A1 |   | 4/2020 | |
| WO | 2020144807 A1 |   | 7/2020 | |

* cited by examiner

*Primary Examiner* — Chan S Park
*Assistant Examiner* — Daniel C Chang
(74) *Attorney, Agent, or Firm* — Dickinson Wright, PLLC

(57) ABSTRACT

The driver monitoring device includes a processor configured to detect an opening/closing state of eyes of a driver of a vehicle based on a facial image in which a face of the driver is shown, judge whether the driver has fallen asleep based on the opening/closing state of the eyes, and judge whether the driver is talking. The processor is configured not to judge that the driver has fallen asleep while it is judged that the driver is talking.

5 Claims, 8 Drawing Sheets

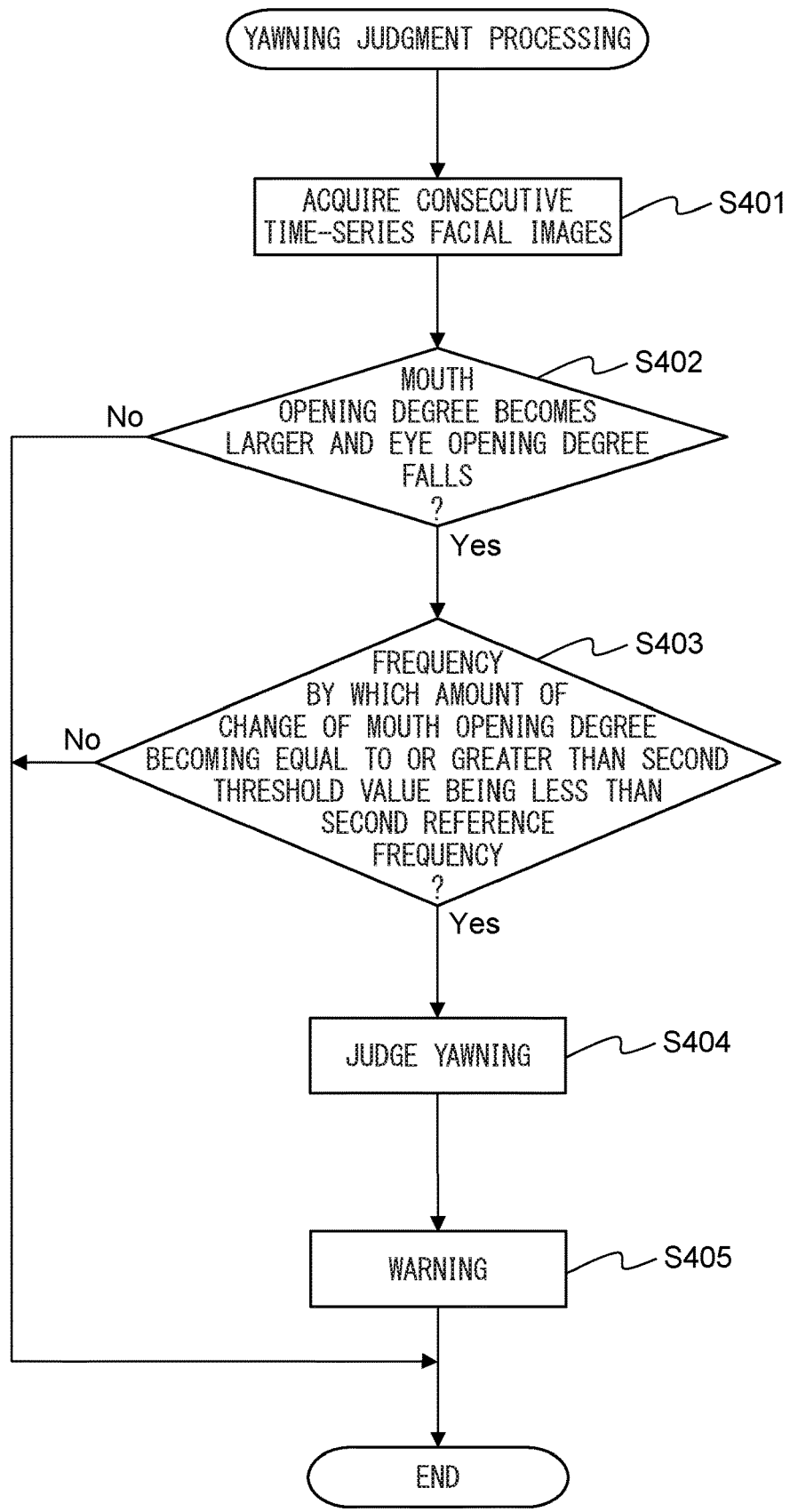

DRIVER MONITORING DEVICE, DRIVER MONITORING METHOD, AND DRIVER MONITORING-USE COMPUTER PROGRAM

FIELD

The present disclosure relates to a driver monitoring device, a driver monitoring method, and a driver monitoring-use computer program.

BACKGROUND

It has been known in the past to use an image capturing device provided in a vehicle to monitor a condition of a driver (for example, PTLs 1 and 2). For example, if a state where the driver's eyes are closed is continuously detected based on a facial image of the driver generated by the image capturing device, it is judged that the driver has fallen asleep and a warning is given to the driver.

CITATIONS LIST

Patent Literature

PTL 1: Japanese Unexamined Patent Publication No. 2020-149499
PTL 2: Japanese Patent No. 6689470

SUMMARY

Technical Problem

However, factors other than sleep are liable to also cause judgment that a driver has closed his eyes. For example, typically, when a person laughs, he squints and as a result his eye opening degree becomes smaller. For this reason, when a driver is laughing, the driver is liable to be judged as having fallen asleep. The warning issued at that time is liable to irritate the driver.

Therefore, in consideration of the above problem, an object of the present disclosure is to keep it from being mistakenly judged that a driver has fallen asleep.

Solution to Problem

The summary of the present disclosure is as follows.

(1) A driver monitoring device comprising: a sleep judging part configured to detect an opening/closing state of eyes of a driver of a vehicle based on a facial image in which a face of the driver is shown and judge whether the driver has fallen asleep based on the opening/closing state of the eyes; and a talking judging part configured to judge whether the driver is talking, wherein the sleep judging part is configured not to judge that the driver has fallen asleep while it is judged that the driver is talking.

(2) The driver monitoring device described in above (1), wherein the sleep judging part is configured not to judge that the driver has fallen asleep until a predetermined time period has elapsed from when it is judged that the driver has finished talking.

(3) The driver monitoring device described in above (1) or (2), wherein the talking judging part is configured to judge whether the driver is talking based on the facial image.

(4) The driver monitoring device described in above (3), wherein the talking judging part is configured to calculate a mouth opening degree of the driver based on the facial image and, if a frequency by which an amount of change of the mouth opening degree becomes equal to or greater than a predetermined first threshold value is equal to or greater than a predetermined first reference frequency, judge that the driver is talking.

(5) The driver monitoring device described in any one of above (1) to (4), further comprising a yawning judging part configured to judge whether the driver is yawning based on the facial image, wherein the yawning judging part is configured to detect an eye opening degree and a mouth opening degree of the driver based on the facial image and, when the mouth opening degree is equal to or greater than a predetermined upper threshold value, if the eye opening degree becomes equal to or less than a predetermined lower threshold value and a frequency by which an amount of change of the mouth opening degree becomes equal to or greater than a predetermined second threshold value is less than a predetermined second reference frequency, judge that the driver is yawning.

(6) A driver monitoring method comprising: detecting an opening/closing state of eyes of a driver of a vehicle based on a facial image in which a face of the driver is shown and judging whether the driver has fallen asleep based on the opening/closing state of the eyes; judging whether the driver is talking; and not judging that the driver has fallen asleep while it is judged that the driver is talking.

(7) A driver monitoring-use computer program causes a computer to: detect an opening/closing state of eyes of a driver of a vehicle based on a facial image in which a face of the driver is shown and judge whether the driver has fallen asleep based on the opening/closing state of the eyes; judge whether the driver is talking; and not judge that the driver has fallen asleep while it is judged that the driver is talking.

According to the present disclosure, it is possible to keep it from being mistakenly judged that a driver has fallen asleep.

BRIEF DESCRIPTION OF DRAWINGS

FIG. 9 is a flow chart showing a control routine of yawning judgment processing in the third embodiment of the present disclosure.

DESCRIPTION OF EMBODIMENTS

Figure 1:
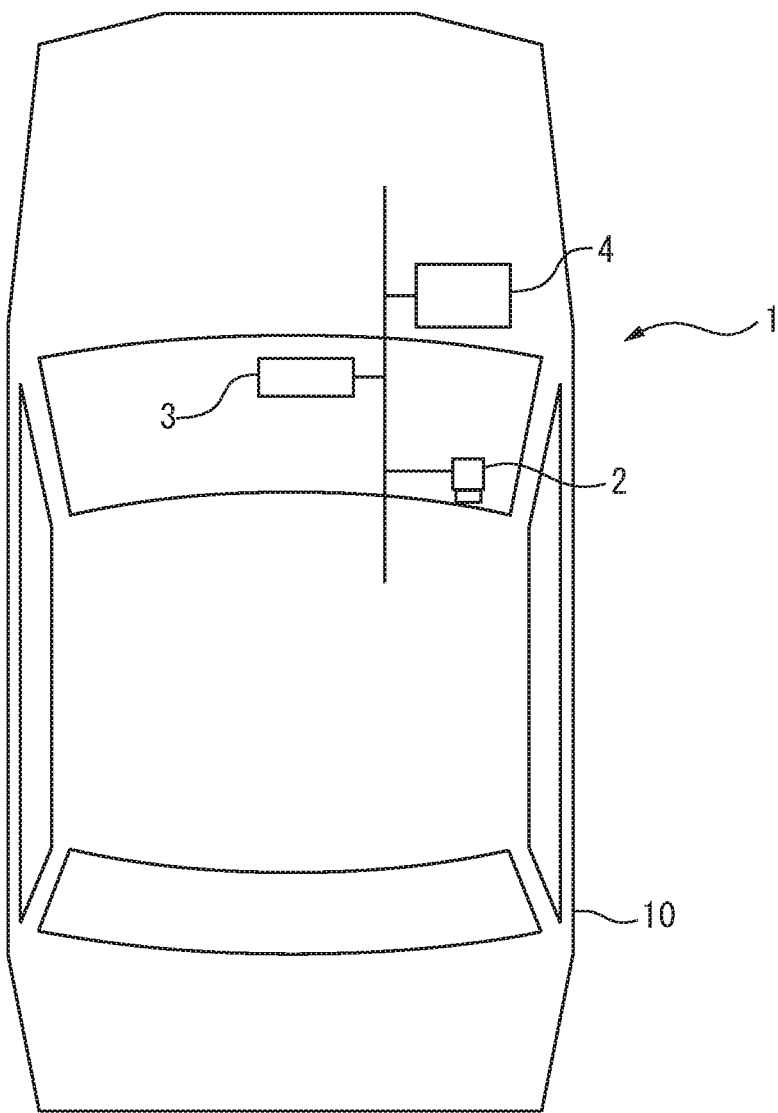
FIG. 1 is a schematic view of the configuration of a vehicle control system provided with a driver monitoring device according to a first embodiment of the present disclosure.

Below, referring to the drawings, embodiments of the present disclosure will be explained in detail. Note that in the following explanations, similar component elements will be assigned the same reference notations.

First Embodiment

Below, referring to FIG. 1 to FIG. 6, a first embodiment of the present disclosure will be explained. FIG. 1 is a schematic view of the configuration of a vehicle control system 1 provided with a driver monitoring device according to the first embodiment of the present disclosure. The vehicle control system 1 is mounted in a vehicle 10 and controls the vehicle 10. As shown in FIG. 1, the vehicle control system 1 is provided with an image capturing device 2, a human-machine interface (HMI) 3, and an electronic control unit (ECU) 4.

The image capturing device 2 captures an image of a face of the driver of the vehicle 10 and generates a facial image of the driver in which the face of the driver is shown. The image capturing device 2 is electrically connected to the ECU 4. The output of the image capturing device 2, that is, a facial image generated by the image capturing device 2, is sent to the ECU 4. Note that, the image capturing device 2 is also called a "driver monitoring camera". Below, a specific example of the configuration of the image capturing device 2 will be explained.

The image capturing device 2 includes a camera and a projector. The camera is composed of a lens and an image capturing element and is for example a CMOS (complementary metal oxide semiconductor) camera or CCD (charge coupled device) camera. The projector is comprised of LEDs (light emitting diodes). For example, it is comprised of two near infrared LEDs placed at the both sides of the camera. By firing near infrared light beams at the driver, it is possible to capture an image of the face of the driver without irritating the driver even at night time or otherwise when the luminance is low. Further, a band pass filter removing light of wavelength components other than near infrared light is provided inside the camera, while a visible light cut filter removing light of the red wavelength component fired from the near infrared LEDs is provided in front of the projector.

Figure 2:
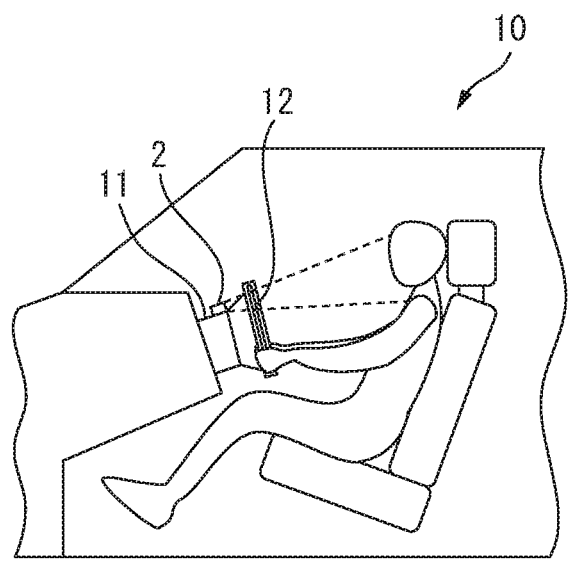
FIG. 2 is a view schematically showing an inside of a vehicle in which an image capturing device is provided.

FIG. 2 is a view schematically showing an inside of a vehicle 10 in which an image capturing device 2 is provided. The image capturing device 2 is provided at the inside of the vehicle so as to capture an image of the face of the driver of the vehicle 10. For example, as shown in FIG. 2, the image capturing device 2 is provided at the top part of a steering column 11 of the vehicle 10. In FIG. 2, the range of projection of the image capturing device 2 is shown by the broken lines. Note that, the image capturing device 2 may be provided at the steering wheel 12, a room mirror, an instrument panel, an instrument panel hood, etc. of the vehicle 10. Further, the vehicle control system 1 may be provided with a plurality of image capturing devices.

The HMI 3 inputs and outputs information between the driver and the vehicle 10. The HMI 3 includes, for example, a display for displaying information, a speaker for generating sound, operation buttons, operation switches, or a touch screen for the driver to perform entry operations, a microphone for receiving speech of the driver, etc. The HMI 3 is electrically connected to the ECU 4. Therefore, the output of the ECU 4 is sent through the HMI 3 to the driver, while input from the driver is sent through the HMI 3 to the ECU 4. The HMI 3 is one example of an input device, an output device, or an input-output device.

Figure 3:
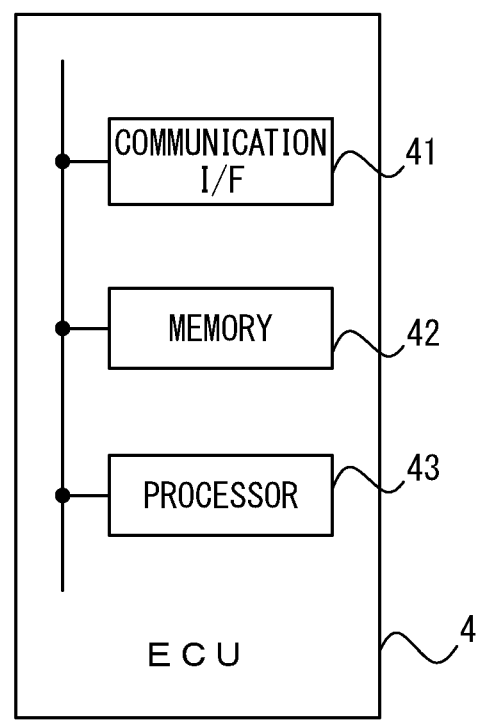
FIG. 3 is a view schematically showing a configuration of an ECU.

FIG. 3 is a view schematically showing a configuration of an ECU 4. The ECU 4 performs various controls of the vehicle. As shown in FIG. 3, the ECU 4 is provided with a communication interface 41, a memory 42, and a processor 43. The communication interface 41 and the memory 42 are connected to the processor 43 through signal wires.

The communication interface 41 has an interface circuit for connecting the ECU 4 to an internal vehicle network based on the CAN (Controller Area Network) or other standard. The ECU 4 communicates with vehicle-mounted devices connected to the internal vehicle network through the communication interface 41 and the internal vehicle network.

The memory 42, for example, has a volatile semiconductor memory (for example, RAM) and a nonvolatile semiconductor memory (for example, ROM). The memory 22 stores programs to be run by the processor 43, various types of data to be used when various types of processing are performed by the processor 43, etc.

The processor 43 has one or more CPUs (central processing units) and their peripheral circuits and performs various types of processing. Note that the processor 43 may further have other processing circuits such as logic units, arithmetic units, or graphic processing units.

Figure 4:
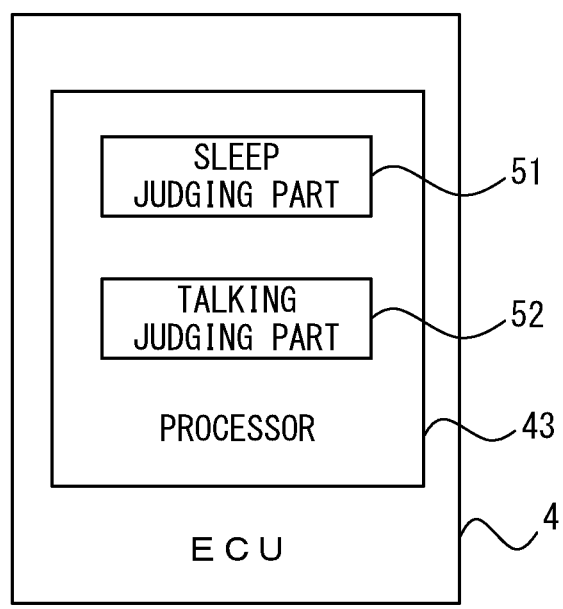
FIG. 4 is a functional block diagram of a processor of the ECU in a first embodiment.

In the present embodiment, the ECU 4 functions as a driver monitoring device monitoring a condition of the driver of the vehicle 10. FIG. 4 is a functional block diagram of the processor 43 of the ECU 4 in the first embodiment. In the embodiment, the processor 43 has a sleep judging part 51 and a talking judging part 52. The sleep judging part 51 and the talking judging part 52 are functional modules realized by a computer program stored in the memory 42 of the ECU 4 being run by the processor 43 of the ECU 4. Note that, these functional modules may respectively be realized by dedicated processing circuits provided at the processor 43. Further, these functional modules may be realized by a plurality of ECUs connected with each other through the internal vehicle network. That is, the plurality of ECUs may function as a driver monitoring device.

As explained above, a facial image generated by the image capturing device 2, that is, a facial image in which the face of the driver of the vehicle 10 is shown, is sent to the ECU 4. The sleep judging part 51 detects an opening/closing state of the eyes of the driver based on the facial image and judges whether the driver has fallen asleep based on the opening/closing state of the eyes.

For example, as an indicator showing the opening/closing state of the eyes of the driver, the eye opening degree of the driver is used. In this case, the sleep judging part 51 detects the eye opening degree of the driver based on the facial image. For example, the sleep judging part 51 identifies a facial region from the facial image to detect the eyes, the nose, the mouth, and other parts of the face. Further, the sleep judging part 51 extracts the feature points of the upper eyelid and lower eyelid for the right eye and left eye and calculates the distances between the two feature points as the eye opening degrees. The eye opening degree detected from one facial image is, for example, calculated as the average of the eye opening degree of the right eye and of the eye opening degree of the left eye.

Note that, a discriminator for image recognition may be used for detecting the eye opening degree of the driver. That is, the sleep judging part 51 may detect the eye opening degree of a driver by inputting a facial image into a discriminator learned in advance to output the eye opening degree from a facial image.

If the eye opening degree of the driver is equal to or less than a predetermined reference value, the sleep judging part 51 judges that the driver is in a closed eye state. The reference value is determined in advance using images of a nonspecific large number of people or the driver when asleep etc. Further, when the closed eye state is maintained for equal to or greater than a predetermined reference time, that is, when the eye opening degree of the driver has been maintained at a value of equal to or less than the reference value for equal to or greater than a reference time, the sleep judging part 51 judges that the driver has fallen asleep. The reference time is determined in advance so as to become longer than the time when the eyes close due to blinking and, for example, is set to 1 second to 7 seconds.

Note that, the sleep judging part 51 may detect the opening/closing state of the eyes of the driver by inputting a facial image into a discriminator learned in advance to classify the states of the eyes of a driver into an open eye state or a closed eye state based on the facial image. In this case as well, the sleep judging part 51 judges that the driver has fallen asleep if the closed eye state is maintained for equal to or greater than a reference time. As the discriminator for outputting the eye opening degree or state of the eyes, for example, a neural network (for example, convolutional neural network (CNN) etc.), a support vector machine, a random forest, or other machine learning model may be used.

If judging that the driver has fallen asleep, the sleep judging part 51 issues a warning to the driver by outputting at least one of a visual warning and an audio warning by the HMI 3. By doing this, it is possible to keep the driver from falling asleep.

On the other hand, the talking judging part 52 judges whether the driver of the vehicle 10 is talking. For example, the talking judging part 52 judges whether the driver is talking based on a facial image generated by the image capturing device 2, that is, a facial image in which the face of the driver of the vehicle 10 is shown.

When a person is talking, his mouth frequently opens and closes in accordance with movement of his mouth and the mouth opening degree changes. For this reason, the talking judging part 52 detects the mouth opening degree of the driver based on the facial image and judges whether the driver is talking based on the mouth opening degree. For example, the talking judging part 52 identifies a facial region from the facial image to detect the eyes, the nose, the mouth, and other parts of the face. Further, the talking judging part 52 extracts the feature points of the upper lip and lower lip and calculates the distance between the two feature points as the mouth opening degree.

Note that, a discriminator for image recognition may be used for detecting the mouth opening degree of the driver. That is, the talking judging part 52 may detect the mouth opening degree of a driver by inputting a facial image into a discriminator learned in advance to output the mouth opening degree from a facial image.

If a frequency by which the amount of change of the mouth opening degree becoming equal to or greater than a predetermined first threshold value is equal to or greater than a predetermined first reference frequency, the talking judging part 52 judges that the driver is talking. The first threshold value and the first reference frequency are determined in advance using consecutive time-series facial images, etc. when a nonspecific large number of people or the driver are talking.

Note that, the talking judging part 52 may judge whether the driver is talking by inputting consecutive time-series facial images into a discriminator learned in advance so as to classify states of the driver into a talking state or a nontalking state based on the facial images. As the discriminator for outputting the mouth opening degree or the state of the driver, for example, a neural network (for example, convolutional neural network (CNN), recurrent neural network (RNN), etc.), a support vector machine, a random forest, or other machine learning model may be used.

In this regard, even if as explained above it is detected that the closed eye state of the driver is being maintained, this does not necessarily mean the driver has fallen asleep. For example, typically when a person laughs, he squints and as a result his eye opening degree becomes smaller. For this reason, when a driver is laughing, the driver is liable to be judged as having fallen asleep. The warning issued at that time is liable to irritate the driver.

Therefore, it is desirable to be able to discriminate between eyes closing due to falling asleep and eyes closing due to a laughing face. For example, as a situation in which the driver has a laughing face, the case where the driver is talking with another person may be envisioned. For this reason, there is a high possibility of the closed eye state detected during talking being due to a laughing face.

Therefore, in the present embodiment, the sleep judging part 51 does not judge that the driver has fallen asleep while it is judged by the talking judging part 52 that the driver is talking. That is, even if the closed eye state of the driver is maintained, the sleep judging part 51 does not judge that the driver has fallen asleep so long as it is judged that the driver is talking. In this case, even if a laughing face of the driver due to talking is judged as a closed eye state, it is never judged that the driver has fallen asleep. Therefore, it is possible to keep from mistakenly judging that the driver has fallen asleep.

<Talking Judgment Processing>

Figure 5:
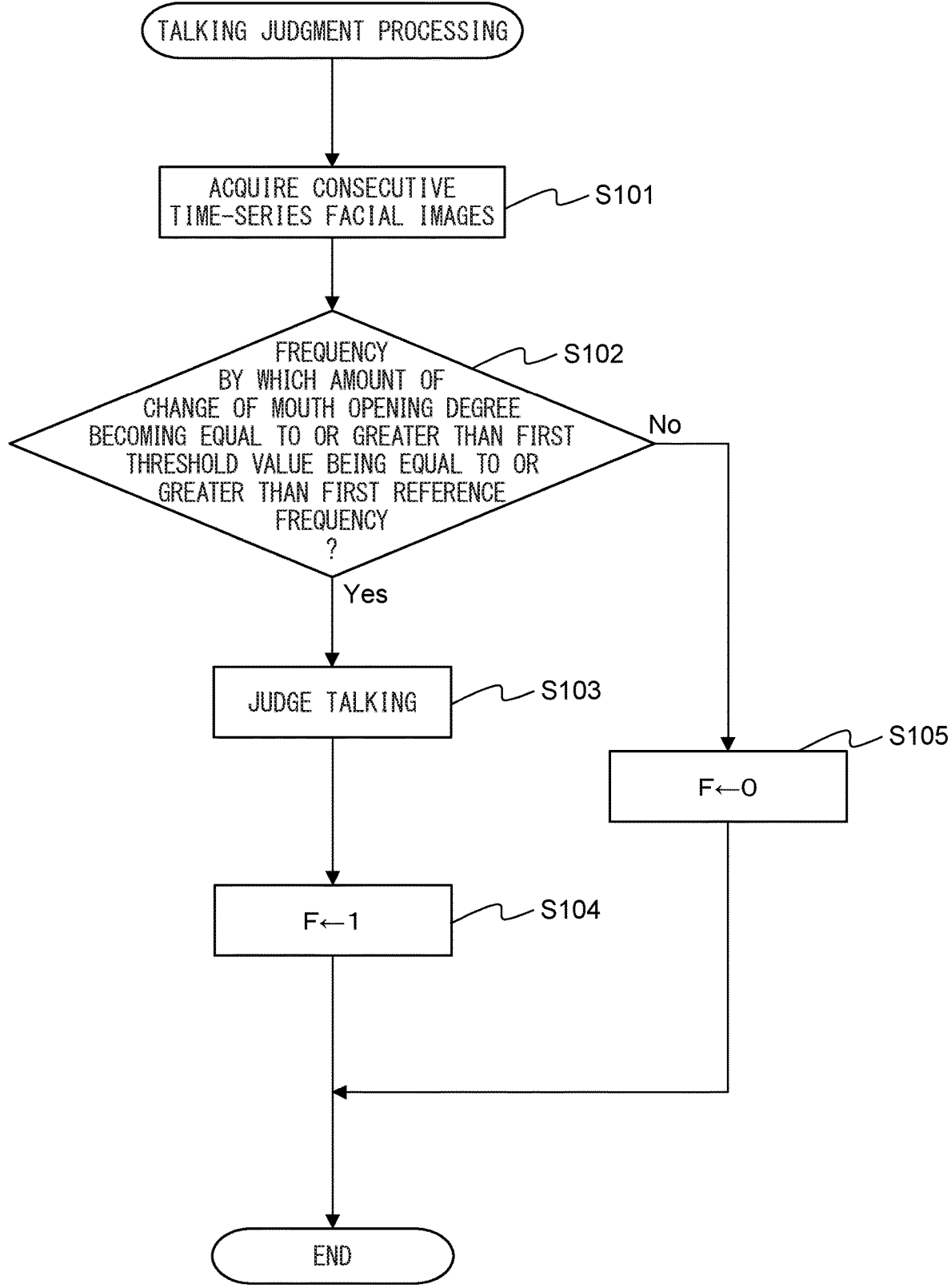
FIG. 5 is a flow chart showing a control routine of talking judgment processing in the first embodiment of the present disclosure.

Below, referring to FIG. 5 and FIG. 6, the flow of the above-mentioned control will be explained. FIG. 5 is a flow chart showing a control routine of talking judgment processing in the first embodiment of the present disclosure. This control routine is repeatedly performed by the ECU 4 at predetermined time intervals.

First, at step S101, the talking judging part 52 acquires consecutive time-series facial images generated by the image capturing device 2 in a predetermined time period up to the present. These consecutive facial images are, for example, stored in the memory 42 of the ECU 4. In the memory 42, to enable a predetermined number of the latest facial images corresponding to images generated in a predetermined time period to the present to be stored in the memory 42, the oldest facial image is deleted each time a facial image is sent from the image capturing device 2 to the ECU 4.

Next, at step S102, the talking judging part 52 judges based on the consecutive time-series facial images whether a frequency by which the amount of change of the mouth opening degree of the driver becoming equal to or greater than the first threshold value is equal to or greater than a first reference frequency. For example, the talking judging part 52 detects the mouth opening degree for each of the consecutive facial images and, if the number of times the mouth opening degree changes between a lower threshold value and an upper threshold value is equal to or greater than a predetermined number, judges that the frequency by which the amount of change of the mouth opening degree becoming equal to or greater than the first threshold value is equal to or greater than the first reference frequency.

If at step S102 it is judged that the frequency by which the amount of change of the mouth opening degree becoming equal to or greater than the first threshold value is equal to or greater than the first reference frequency, the present control routine proceeds to step S103. At step S103, the talking judging part 52 judges that the driver is talking.

Next, at step S104, the talking judging part 52 sets the sleep judgment prohibit flag F to "1". After step S104, the present control routine ends.

On the other hand, if at step S102 it is judged that the frequency by which the amount of change of the mouth opening degree becoming equal to or greater than the first threshold value is less than the first reference frequency, the present control routine proceeds to step S105. At step S105, the talking judging part 52 sets the sleep judgment prohibit flag F to zero. After step S105, the present control routine ends.

Note that, at step S102, the talking judging part 52 may judge whether the driver is talking by entering consecutive time-series facial images into a discriminator without detecting the mouth opening degree.

<Sleep Judgment Processing>

Figure 6:
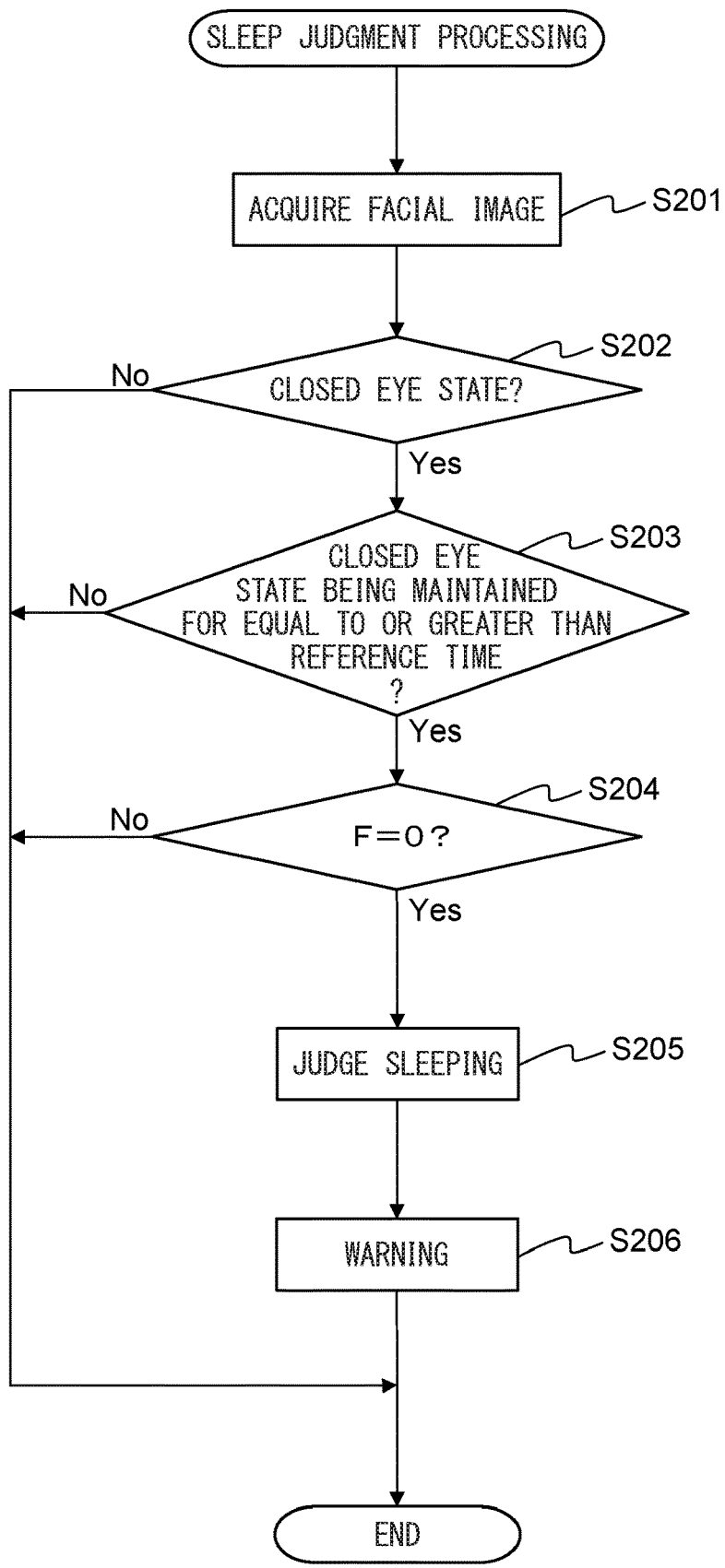
FIG. 6 is a flow chart showing a control routine of sleep judgment processing in the first embodiment of the present disclosure.

FIG. 6 is a flow chart showing a control routine of sleep judgment processing in the first embodiment of the present disclosure. This control routine is repeatedly performed by the ECU 4 at predetermined time intervals.

First, at step S201, the sleep judging part 51 acquires a facial image generated by the image capturing device 2.

Next, at step S202, the sleep judging part 51 judges whether the driver is in a closed eye state based on the facial image. Specifically, when the eye opening degree of the driver is equal to or less than a reference value, the sleep judging part 51 judges that the driver is in a closed eye state, while when the eye opening degree of the driver is larger than the reference value, it judges that the driver is in an open eye state. Note that, the sleep judging part 51 may judge whether the driver is in a closed eye state by inputting a facial image into a discriminator without detecting the eye opening degree.

If at step S202 it is judged that the driver is in a closed eye state, that is, if it is judged that the eyes of the driver are closed, the present control routine proceeds to step S203. At step S203, the sleep judging part 51 judges whether the closed eye state has been maintained for equal to or greater than a reference time. If at step S203 it is judge that the closed eye state has been maintained for equal to or greater than the reference time, the present control routine proceeds to step S204.

At step S204, the sleep judging part 51 judges whether the sleep judgment prohibit flag F has been set to zero. If it is judged that the sleep judgment prohibit flag F has been set to zero, the present control routine proceeds to step S205.

At step S205, the sleep judging part 51 judges that the driver has fallen asleep. Next, at step S206, the sleep judging part 51 issues a warning to the driver by outputting at least one of a visual warning and an audio warning by the HMI 3. Note that, sleep judging part 51 may issue a warning to the driver by another means, for example, making a seat belt of the driver's seat vibrate. After step S206, the present control routine ends.

On the other hand, if at step S202 it is judged that the driver is in an open eye state, if at step S203 it is judged that the closed eye state has not been maintained for equal to or greater than the reference time, or if at step S204 it is judged that the sleep judgment prohibit flag F has been set to "1", the present control routine ends. In this case, the sleep judging part 51 does not judge that the driver has fallen asleep.

Note that, step S204 may be performed before step S201. That is, the sleep judging part 51 may not detect the opening/closing state of the eyes of the driver while it is judged that the driver is talking.

Second Embodiment

The driver monitoring device according to a second embodiment is basically similar in configuration and control to the driver monitoring device according to the first embodiment except for the points explained below. For this reason, below, the second embodiment of the present disclosure will be explained focusing on parts different from the first embodiment.

In the first embodiment, sleep judgment was prohibited while the driver was talking. However, even if the driver was not talking, there would be a possibility of the driver laughing due to a passenger talking. Such a situation easily arises right after the driver has been talking. Further, there is little possibility of the driver falling asleep right after the driver was talking.

For this reason, in the second embodiment, the sleep judging part 51 does not judge that the driver has fallen asleep not only while it is judged that the driver is talking, but also until a predetermined time period has elapsed from when it is judged that the driver has finished talking. Due to this, it is possible to keep it from being from mistakenly judged that the driver has fallen asleep even more.

<Talking Judgment Processing>

Figure 7:
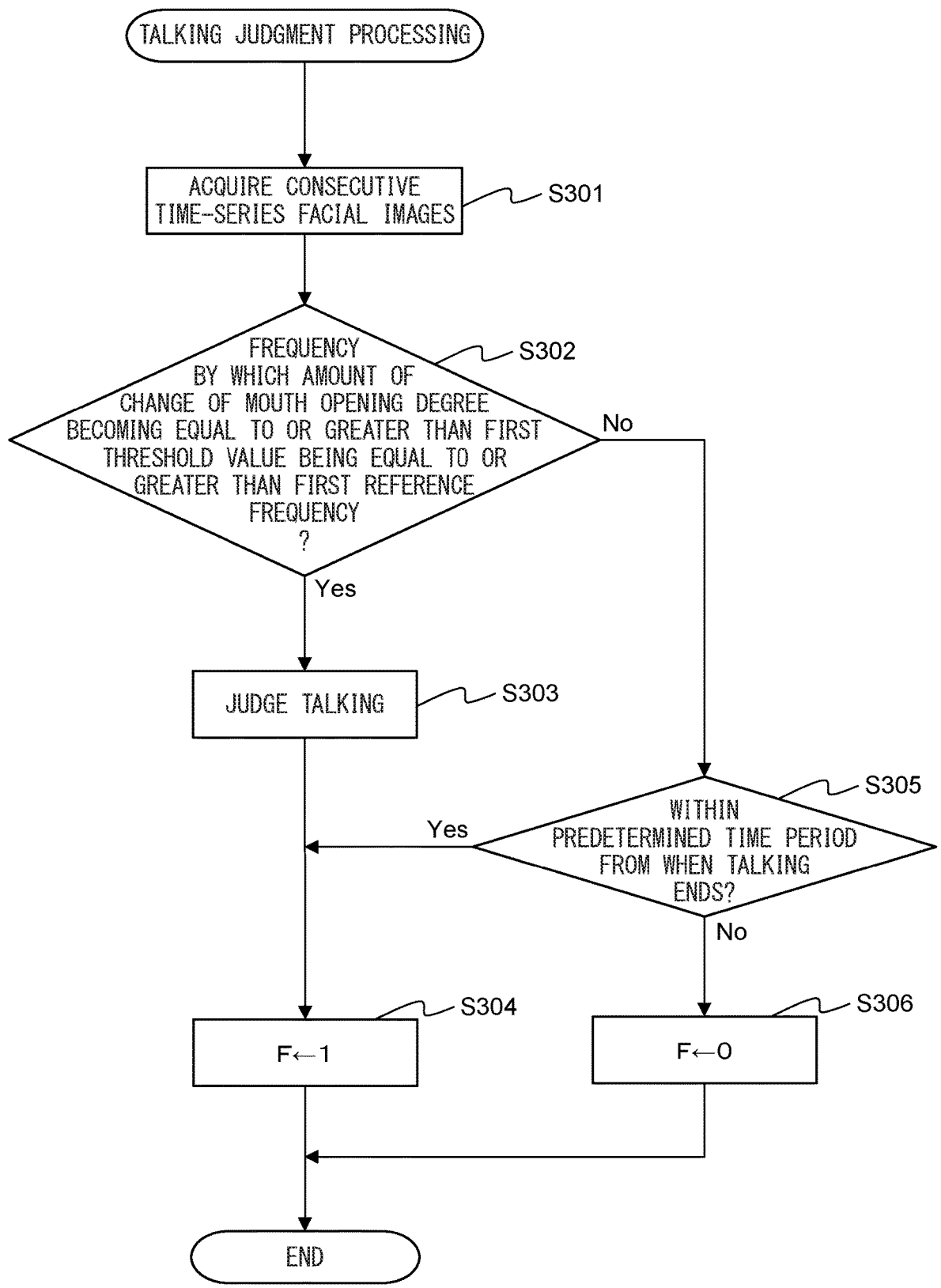
FIG. 7 is a flow chart showing a control routine of talking judgment processing in the second embodiment of the present disclosure.

FIG. 7 is a flow chart showing a control routine of talking judgment processing in the second embodiment of the present disclosure. This control routine is repeatedly performed by the ECU 4 at predetermined time intervals.

Steps S301 to S304 are performed in the same way as steps S101 to S104 of FIG. 5. On the other hand, if at step S302 it is judged that the frequency by which the amount of change of the mouth opening degree becoming equal to or greater than the first threshold value is less than the first reference frequency, the present control routine proceeds to step S305.

At step S305, the talking judging part 52 judges whether it is within a predetermined time period from when the driver finished talking. The predetermined time is, for example, 5 seconds to 20 seconds. Note that, when the result of judgment at step S302 changes from yes to no, the talking judging part 52 judges that the driver has finished talking.

If at step S305 it is judged that it is within a predetermined time period from when the driver finished talking, the present control routine proceeds to step S304. At step S304, the talking judging part 52 sets the sleep judgment prohibit flag F to "1". After step S304, the present control routine ends.

On the other hand, if at step S305 it is judged that it is not within a predetermined time period from when the driver finished talking, the present control routine proceeds to step S306. At step S306, the talking judging part 52 sets the sleep judgment prohibit flag F to zero. After step S306, the present control routine ends.

In the second embodiment as well, the control routine of the sleep judgment processing of FIG. 6 is performed in the same way as the first embodiment.

Third Embodiment

The driver monitoring device according to the third embodiment is basically similar in configuration and control to the driver monitoring device according to the first embodiment except for the points explained below. For this reason, below, the third embodiment of the present disclosure will be explained focusing on parts different from the first embodiment.

Figure 8:
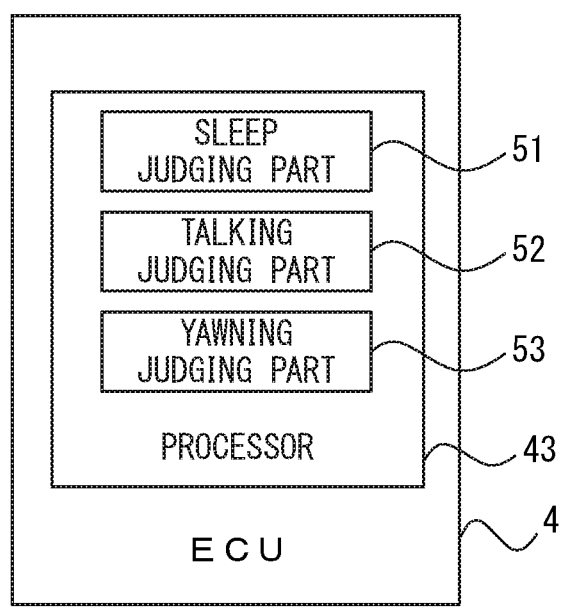
FIG. 8 is a functional block diagram of the processor of the ECU in a third embodiment.

FIG. 8 is a functional block diagram of the processor 43 of the ECU 4 in the third embodiment. In the third embodiment, the processor 43 has a yawning judging part 53 in addition to the sleep judging part 51 and the talking judging part 52. The sleep judging part 51, the talking judging part 52, and the yawning judging part 53 are functional modules realized by a computer program stored in the memory 42 of the ECU 4 being run by the processor 43 of the ECU 4. Note that, these functional modules may respectively be realized by dedicated processing circuits provided at the processor 43. Further, these functional modules may be realized by a plurality of ECUs connected with each other through the internal vehicle network. That is, the plurality of ECUs may function as a driver monitoring device.

The yawning judging part 53 judges whether the driver is yawning based on a facial image generated by the image capturing device 2, that is, a facial image in which the face of the driver of the vehicle 10 is shown. Usually, if a person is yawning, the movement of the eyes is associated with movement of the mouth. As the mouth opening degree becomes larger, the eye opening degree becomes smaller. Further, unlike with talking, when a person yawns, his mouth opens only once and his mouth never successively opens and closes.

For this reason, the yawning judging part 53 detects the eye opening degree and the mouth opening degree of the driver based on a facial image and, when the mouth opening degree is equal to or greater than a predetermined upper threshold value, if the eye opening degree becomes equal to or less than a predetermined lower threshold value and the frequency by which the amount of change of the mouth opening degree becoming equal to or greater than a predetermined second threshold value is less than a predetermined second reference frequency, judges that the driver is yawning. Due to this, it is possible to differentiate between yawning and falling asleep and precisely detect yawning. Note that, the eye opening degree and the mouth opening degree of the driver are detected by the techniques explained above relating to the sleep judging part 51 and the talking judging part 52.

<Yawning Judgment Processing>

In the third embodiment, a control routine of yawning judgment processing of FIG. 9 is performed in addition to the control routine of talking judgment processing of FIG. 5 and the control routine of sleep judgment processing of FIG. 6. FIG. 9 is a flow chart showing a control routine of yawning judgment processing in the third embodiment of the present disclosure. This control routine is repeatedly performed by the ECU 4 at predetermined time intervals.

First, at step S401, in the same way as the processing by the talking judging part at step S101 of FIG. 5, the yawning judging part 53 acquires consecutive time-series facial images generated by the image capturing device 2 at a predetermined time period until the present.

Next, at step S402, the yawning judging part 53 judges whether the mouth opening degree of the driver has become larger and the eye opening degree of the driver has fallen based on the consecutive time-series facial images. Specifically, the yawning judging part 53 detects the mouth opening degree and the eye opening degree for each of the consecutive facial images and judges whether the eye opening degree has become equal to or less than a lower limit threshold value when the mouth opening degree is equal to or greater than an upper limit threshold value. If the judgment at step S402 is no, the present control routine ends.

On the other hand, if at step S402 it is judged that the eye opening degree has become equal to or less than a lower limit threshold value when the mouth opening degree is equal to or greater than an upper limit threshold value, the present control routine proceeds to step S403. At step S403, the yawning judging part 53 judges whether the frequency by which the amount of change of the mouth opening degree of the driver becoming equal to or greater than the second threshold value is less than a second reference frequency based on the consecutive time-series facial images. The second threshold value and the second reference frequency are determined in advance using consecutive time-series facial images when a nonspecific large number of people or the driver are yawning etc. Note that, the second threshold value and the second reference frequency may respectively be the same values as the first threshold value and first reference frequency used in the talking judgment. For example, the yawning judging part 53 detects the mouth opening degree for each of the consecutive facial images and, if the number of times the mouth opening degree changes between a lower threshold value and an upper threshold value is less than a predetermined number of times, judges that the frequency by which the amount of change of the mouth opening degree becomes equal to or greater than the second threshold value is less than the second reference frequency.

If at step S403 it is judged that the frequency by which the amount of change of the mouth opening degree becomes equal to or greater than the second threshold value is equal to or greater than the second reference frequency, the present control routine ends. On the other hand, if at step S403 it is judged that the frequency by which the amount of change of the mouth opening degree becomes equal to or greater than the second threshold value is less than the second reference value, the present control routine proceeds to step S404.

At step S404, the yawning judging part 53 judges that the driver is yawning. Next, at step S405, the yawning judging part 53 issues a warning to the driver by outputting at least one of a visual warning and an audio warning by the HMI 3. Note that, the yawning judging part 53 may issue a warning to the driver by another means, for example, making a seat belt of the driver's seat vibrate. Further, the strength of the warning in the yawning judgment may be set lower than the strength of the warning in the sleep judgment. Further, the yawning judging part 53 may issue a warning to the driver when the number of times it is judged the driver is yawning in a predetermined time period reaches a predetermined number of times. After step S405, the present control routine ends.

Above, preferred embodiments according to the present disclosure were explained, but the present disclosure is not limited to these embodiments. Various corrections and changes can be made within the language of the claims.

For example, the talking judging part 52 may judge whether the driver is talking based on an input signal to a microphone (for example, a microphone of the HMI 3) provided inside the passenger compartment so as to catch the voice of the driver. In this case, the talking judging part 52 judges that the driver is talking if, for example, the frequency of the input signal to the microphone is a frequency of a predetermined range corresponding to the human voice.

Further, the talking judging part 52 may judge whether the driver is talking by inputting an input signal to a microphone into a discriminator learned in advance so as to classify states of the driver into a talking state or a nontalking state based on the input signal to a microphone. In this case, as the discriminator, for example, a neural network (for example, recurrent neural network (RNN)), a support vector machine, a random forest, or other machine learning model may be used.

Further, a computer program for causing a computer to realize the functions of the different parts of the processor of the driver monitoring device according to the above embodiments may be provided in a form stored in a recording medium able to be read by a computer. A recording medium able to be read by a computer is, for example, a magnetic recording medium, an optical recording medium, or a semiconductor memory.

Further, the above embodiments can be worked freely combined. If the second embodiment and the third embodiment are combined, the control routine of the talking judgment processing of FIG. 7, the control routine of the sleep judgment processing of FIG. 6, and the control routine of the yawning judgment processing of FIG. 9 are performed.

REFERENCE SIGNS LIST 10 vehicle
4 electronic control unit (ECU)
43 processor
51 sleep judging part
52 talking judging part

The invention claimed is:

1. A driver monitoring device comprising a camera installed in a vehicle and oriented towards a face of a driver of the vehicle, a human machine interface adapted to output a warning to the driver if the driver is judged to have fallen asleep, and a processor configured to:
   detect an opening/closing state of eyes of the driver of the vehicle based on a first time series of facial images received from the camera in which the face of the driver is shown,
   judge that the driver has fallen asleep if the opening/closed state of the eyes are detected to be in a closed state for more than a predetermined period of time;
   detect a first frequency by which an amount of change of a mouth opening degree of the driver becomes equal to or greater than a predetermined first threshold value based on a second time series of facial images received from the camera; and
   judge whether the driver is talking if the first frequency is equal to or greater than a predetermined first reference frequency, wherein
   the processor causes the human machine interface to output a warning to the driver if the driver is judged to have fallen asleep; and
   the processor does not judge that the driver has fallen asleep and does not cause the human machine interface to output a warning to the driver, if the opening/closing state of the eyes is closed, while it is judged that the driver is talking.

2. The driver monitoring device according to claim 1, wherein the processor is configured not to judge that the driver has fallen asleep, if the opening/closing state of the eyes is closed, until a predetermined time period has elapsed from when it is judged that the driver has finished talking.

3. The driver monitoring device according to claim 1, wherein the processor is configured to judge whether the driver is yawning based on a facial image received from the camera, detect an eye opening degree and a mouth opening degree of the driver based on the facial image, detect a second frequency by which the amount of change of the mouth opening degree becomes equal to or greater than a predetermined second threshold value and, when the mouth opening degree is equal to or greater than a predetermined upper threshold value, if the eye opening degree becomes equal to or less than a predetermined lower threshold value and the second frequency is less than a predetermined second reference frequency, judge that the driver is yawning.

4. A driver monitoring method comprising:
   detecting an opening/closing state of eyes of a driver of a vehicle based on a first time series of facial images received from a camera installed in a vehicle and oriented towards a face of a driver of the vehicle, in which the face of the driver is shown;
   judging that the driver has fallen asleep if the opening/closed state of the eyes are detected to be in a closed state for more than a predetermined period of time;
   detecting a first frequency by which an amount of change of a mouth opening degree of the driver becomes equal to or greater than a predetermined first threshold value based on a second time series of facial images received from the camera;
   judging whether the driver is talking if the first frequency is equal to or greater than a predetermined first reference frequency;
   outputting a warning to the driver via a human machine interface installed in the vehicle if the driver is judged to have fallen asleep; and
   not judging that the driver has fallen asleep and not outputting a warning to the driver via the human machine interface, if the opening/closing state of the eyes is closed, while it is judged that the driver is talking.

5. A non-transitory recording medium having recorded thereon a computer program causing a computer to:
   detect an opening/closing state of eyes of a driver of a vehicle based on a first time series of facial images received from a camera installed in a vehicle and oriented towards a face of a driver of the vehicle, in which the face of the driver is shown;
   judge that the driver has fallen asleep if the opening/closed state of the eyes are detected to be in a closed state for more than a predetermined period of time;
   detect a first frequency by which an amount of change of a mouth opening degree of the driver becomes equal to or greater than a predetermined first threshold value based on a second time series of facial images received from the camera;
   judge whether the driver is talking if the first frequency is equal to or greater than a predetermined first reference frequency;
   output a warning to the driver via a human machine interface installed in the vehicle if the driver is judged to have fallen asleep; and
   not judge that the driver has fallen asleep and not output a warning to the driver via the human machine interface, if the opening/closing state of the eyes is closed, while it is judged that the driver is talking.

* * * * *